AMPLIFYING SWITCH WITH OUTPUT LEVEL DEPENDENT UPON A COMPARISON OF THE INPUT AND A ZENER STABILIZED CONTROL SIGNAL

Filed Nov. 10, 1958 2 Sheets-Sheet 1

INVENTOR.
GUSTAVO GARCIA
BY [signature]

July 24, 1962 G. GARCIA 3,046,417

AMPLIFYING SWITCH WITH OUTPUT LEVEL DEPENDENT UPON A COMPARISON OF THE INPUT AND A ZENER STABILIZED CONTROL SIGNAL

Filed Nov. 10, 1958 2 Sheets-Sheet 2

INVENTOR.
GUSTAVO GARCIA

BY
J. Gordon Angus

United States Patent Office 3,046,417
Patented July 24, 1962

3,046,417

AMPLIFYING SWITCH WITH OUTPUT LEVEL DEPENDENT UPON A COMPARISON OF THE INPUT AND A ZENER STABILIZED CONTROL SIGNAL

Gustavo Garcia, West Covina, Calif., assignor to Aerojet-General Corporation, Azusa, Calif., a corporation of Ohio Filed Nov. 10, 1958, Ser. No. 772,917
13 Claims. (Cl. 307—88.5)

This invention relates generally to rapid electronic switching devices and particularly to switching devices of the semi-conductor type.

Switching devices form an important element of computers, radar, and pulse modulation or other sampled data systems as they may be employed to enable periodic sampling of a plurality of voltages representing intelligence. Utilization of electronic switching devices employing vacuum tubes is known, however, there are many disadvantages attendant upon their use. Among them are relatively large size and heavy power consumption requirements, coupled with a relatively short life time. Particularly objectionable is the fact that known vacuum tube switching devices operate most satisfactorily on relatively high level signal voltages, and in the absence thereof, a plurality of amplification stages prior to the switch are required. When low voltage levels are switched by such a tube, the transient voltages generated are so large with reference to the switched voltages that the output voltage is not truly representative of the input.

Where the data to be sampled is represented by signal voltages of low level, mechanical type switches or commutators have been utilized in some applications. Although mechanical means will switch low voltage, they are relatively large in size, have a lifetime limited by mechanical wear and in any application require an additional source of driving power.

It is therefore a principal object of the present invention to provide a novel method of and improved means for rapid switching of electronic circuits.

Another object of this invention is to provide a novel method of and improved means for rapid sampling of low signal level data channels.

Yet another object of this invention is to provide an improved electronic gate switch operable at low voltages and having no moving parts.

Still another object of this invention is to provide an improved electronic switch of small weight and size having low power consumption, and having an extended operating lifetime.

In its broadest aspect the invention is a switch comprising a transistor having an input electrode, an output electrode, and an electrode common to both transistor input and output circuits. Means are provided whereby a voltage appears at the output electrode which is representative of the voltage applied to the input electrode but only during the time of application of a controlling pulse to an electrode common to both input and output circuits. A plurality of switches of the present invention may be connected together to form a device particularly suited for the switching of voltages in a plurality of channels.

Figure 1:
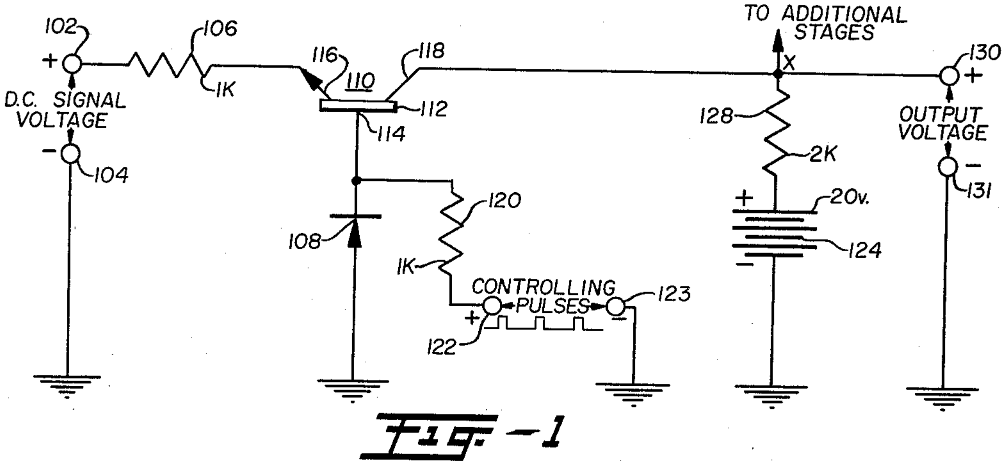
Figure 2B:
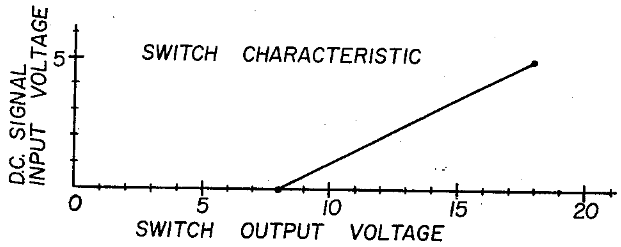
Figure 2A:
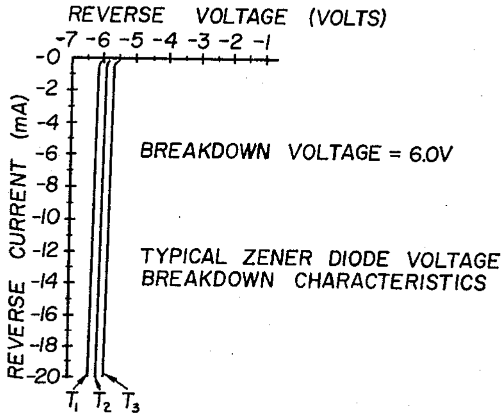
Figure 3:
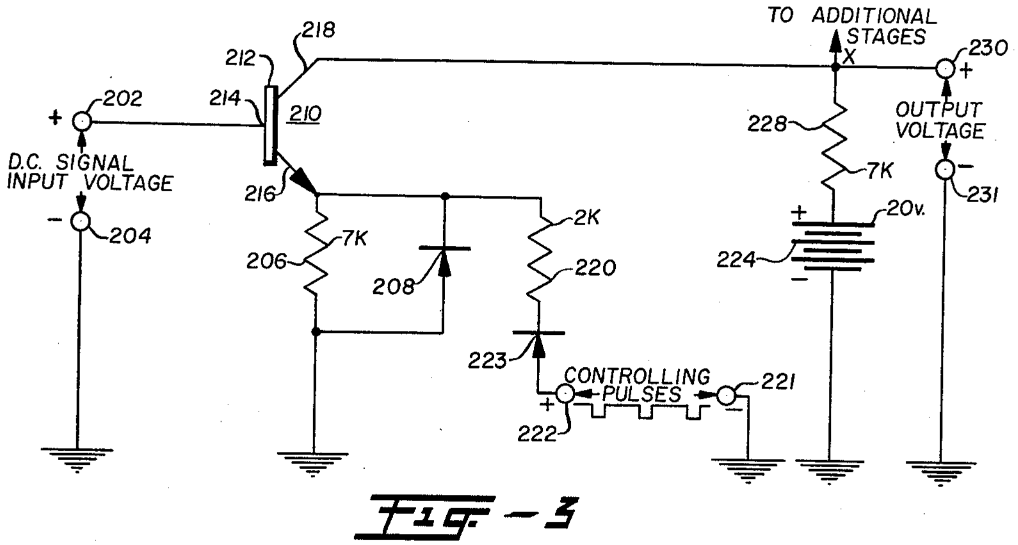
Figure 4:
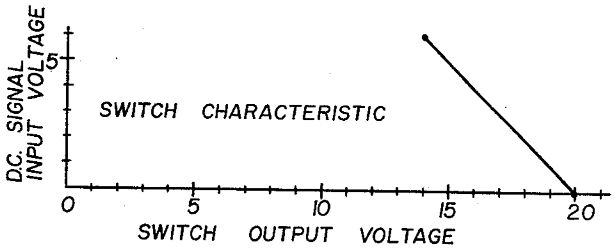

These and other objects, aspects, features, and advantages of the invention will be apparent to those skilled in the art from the following more detailed description taken in conjunction with the appended drawings, wherein:

FIGURE 1 is a schematic diagram of the switch of the present invention arranged in a common base circuit configuration;

FIGURE 2*a* is a chart of a typical voltage-current characteristic of a Zener diode operated in the reverse direction;

FIGURE 2*b* is a chart of input voltage vs. output voltage of the switch of FIGURE 1;

FIGURE 3 is a schematic diagram of an alternate embodiment of the present invention arranged in common emitter configuration; and, FIGURE 4 is a chart of input voltage vs. output voltage of the switch of FIGURE 3.

Reference is made to FIG. 1, a schematic diagram of one embodiment of the present invention. The principal element is a transistor 110, having a semi-conductive body 112, shown here to be of the n-p-n junction type. Transistors are generally three-electrode semi-conductor devices which include a block or body of semi-conductive materials such as germanium or silicon. These semi-conductive materials may be of the N-type having an excess of the electrons, or may be of the P-type having an excess of "holes." The three main electrodes for a transistor are the emitter, collector, and base electrodes. Junction transistors have a single crystal with one type of semi-conductive material in the center and another type on both sides or ends. The junction transistor may be of the p-n-p or n-p-n type. The base electrode is connected to the central material of one conductivity type and the emitter or collector electrodes are connected to the end materials of an opposite conductivity type respectively.

A p-n-p junction transistor requires means to bias the emitter positively relative to the base and means to bias the collector negatively relative to the base. A n-p-n junction transistor requires means to bias the emitter negatively relative to the base and means to bias the collector positively relative to the base.

The transistor emitter electrode 116 is shown connected to a first signal input terminal 102 through a series input resistance 106. The second signal input terminal 104 is at ground potential. The transistor collector electrode 118 is connected to the positive terminal of a biasing battery 124 through a load resistance 128, while the negative battery terminal is grounded. A first circuit output terminal 130 connects directly to the collector electrode 118 while the second circuit output terminal 131 is at ground potential. Provision is made for the application of controlling pulses to the transistor 110. A first pulse terminal 122 is connected to a dropping resistance 120 which connects to one electrode of a Zener diode 108 or the like arranged in the reverse direction. The other electrode of the Zener diode is grounded, as is the second pulse input terminal 123. A connection is made from the transistor base electrode 114 to the junction point between the dropping resistance 120 and the Zener diode 108. A Zener diode may be considered as a voltage reference source, as when connected in the reverse direction, the diode will break down or conduct at the same voltage irrespective of the current flow therethrough, so long as the current flow is at least the minimum required to produce the Zener voltage across the diode. The operation of a Zener diode may be better understood by reference to FIGURE 2*a* which graphically illustrates the operation of such a device in the reverse conducting or avalanche region. For a complete discussion of Zener and other reference diodes, see page 555 et seq., "Pulse Digital Circuits," Millman and Taub, McGraw-Hill Book Company, Inc., 1956.

The operation of the circuit of FIGURE 1 may be best understood with relation to the typical circuit values presented below in tabular form:

| | |
|---|---|
| R **106** | 1000 ohms |
| R **120** | 1000 ohms |
| R **128** | 2000 ohms |

| | |
|---|---|
| Transistor 110 | T.I. 907 |
| Zener diode 108 (ref. voltage 6 volts) | T.I.652C5 |
| Battery 124 | 20 volts D.C. |
| Input signal Voltage | 0–5 volts D.C. |
| Controlling pulse | 10 volts D.C. |

In operation, the input signal to be sampled is applied to the signal input terminals 102, 104 in the polarity shown. This voltage may be from a transducer or the like having an output capability of 0–5 volts D.C. In the absence of a voltage on the base electrode 114 more positive than that of the emitter electrode 116 no emitter current will flow, hence there will be no current flow in the circuit of the collector electrode 118, and no signal voltage appearing at the circuit output terminals 130, 131. This is the "off" condition.

To turn the switch "on," a controlling pulse is applied to the pulse terminals 122, 123 in the polarity shown. It is contemplated that a gate pulse will ordinarily be the source of controlling potential. The amplitude of the pulse is 10 volts, but it is necessary only that it be of sufficient magnitude to exceed the breakdown voltage of the Zener diode 108 and cause current flow in the reverse direction. The pulse current flows from the first pulse terminal 122 through the back resistance of the Zener diode 108 to ground. Since the pulse amplitude is above the Zener breakdown voltage of 6 volts, the diode 108 will break down and conduct in the reverse direction. The Zener voltage of 6 volts appears at the base electrode 114 as long as the pulse is applied. The Zener diode 108 may now be considered as a voltage source. Assuming the voltage drop between the base electrode 114 and the emitter electrode 116 to be negligible, the voltage drop across the emitter resistor 106 is then equal to the difference between the constant Zener voltage and the value of the input signal voltage. Practically all of the current flowing in the emitter circuit, which is equal to the voltage drop across resistor 106 divided by its resistance, will flow in the collector circuit. The voltage drop across the load resistance 128 caused by the flow of collector current therethrough will appear at output terminals 130, 131 as an output voltage representative of the signal input voltage.

FIGURE 2*b* is a graph showing the relationship of output voltage to signal input voltage with the circuitry of FIGURE 1 and values given in the previous table. Examination of FIGURE 2*b* reveals that for a signal input range of 0 to 5 volts, an output range of 8 to 18 volts is obtainable during the application of a controlling pulse.

By way of example, it is assumed that the signal input voltage at terminals 102, 104 is at its maximum excursion value of plus 5 volts. With the controlling pulse applied at terminals 122, 123, the Zener diode 108 breaks down and a voltage of 6 volts appears at the base electrode 114. Since the emitter-base voltage drop is negligible, the resultant voltage across the input resistor 106 is the difference between 5 and 6 volts, or one volt. This voltage divided by the 1000 ohms of resistance 106 results in an emitter current flow of 1 milliampere, practically all of which appears in the collector circuit. With a collector current of 1 ma. the voltage drop across the 2000 ohms load resistor 128 is 2 volts. The voltage appearing at the output terminals 130, 131 is then the 20 volts of battery 124 minus the load resistor drop of 2 volts, or 18 volts.

Assume now that the signal input voltage at the input terminals 102, 104 is at its minimum value, or zero volts. When the controlling pulse is applied to the pulse terminals 122, 123, the Zener voltage of 6 volts appears across the 1000 ohms input resistor 106 causing a current flow of 6 ma. in the emitter circuit. With a transistor current gain, or alpha, approaching unity, 6 ma. will flow in the collector circuit, causing a voltage drop of 12 volts across the load resistance 128. The voltage appearing at the output terminals 130, 131 is the algebraic sum of battery 124 and this voltage drop, that is 20 minus 12 volts, an output voltage of 8 volts.

It is thus seen that for the particular values given, a signal input variation of 0–5 volts will yield an output voltage variation having a 10 volt range, the output voltage being directly proportional to and in phase with the signal input voltage.

An alternate embodiment of the switch of the present invention is shown in FIGURE 3 which illustrates a transistor 210 arranged in a common emitter configuration. A first signal input terminal 202 connects directly to the transistor base electrode 214 while the second signal input terminal 204 is grounded. The transistor 210 has a semi-conducting body 212 as well as an emitter electrode 216 and a collector electrode 218. The collector electrode 218 is connected directly to a first circuit output terminal 230 while the collector electrode 218 is connected to the positive terminal of a biasing battery 224 through a load resistance 228. The negative terminal of the battery 224 is grounded, as is the second circuit output terminal 231. Controlling pulses which determine whether the switch is "on" or "off" are applied to the controlling pulse terminals 221, 222 in the polarity shown. The first pulse terminal 222 is connected to a conventionally arranged diode 223 which in turn is connected to the transistor emitter electrode 216 through a series dropping resistance 220. The second pulse terminal 221 is at ground potential. A parallel configuration comprising a resistance 206 and a voltage reference diode 208 connected in the reverse direction such as a Zener diode are together connected between the emitter electrode 216 and ground.

Operation of the circuit of FIGURE 3 may be best understood with reference to the typical circuit values presented below in tubular form:

| | |
|---|---|
| R 206 | 7000 ohms |
| R 220 | 2000 ohms |
| R 228 | 7000 ohms |
| Transistor 210 | T.I. #907 |
| Diode 223 | H.D. 6006 |
| Zener diode 208 (ref. voltage 7 volts) | T.I. 653C4 |
| Battery 224 | 20 volts |
| Input signal voltage | 0–6 volts |
| Controlling pulse | 10 volts |

In the "off" condition a pulse of the amplitude of ten volts is placed at the pulse terminals 221, 222 in the polarity shown. The pulse current flows through the diode 223, the resistance 220 and back to ground through the parallel combination of the Zener diode 208 and parallel resistance 206. The current flow is sufficient to cause the Zener diode 208 to break down and conduct in the reverse direction, providing a reference voltage of 7 volts at the emitter electrode 216. Since the voltage range of the input signal lies between the limits of zero to +6 volts, the emitter 216 is always more positive than the base 214 and no emitter current will flow, making the transistor 210 non-conductive.

To turn the switch "on," the amplitude of the controlling pulse is reduced below a value sufficient to cause adequate current flow for breakdown to occur through the Zener diode 208. If, for example, zero volts were now applied at the pulse terminals 221, 222, the diode 223 would be non-conductive as would the Zener diode 208, which can no longer be regarded as a voltage source. In this instance the voltage at the emitter 216 may be regarded as the equivalent of the voltage at the base 214 which is the signal voltage impressed at the input terminals 202, 204. The current flow in the emitter circuit is determined by the value of the resistance 206. The resulting collector current is assumed to be identical, hence the voltage drop across the load resistor 228 is seen to be directly proportional to the signal voltage. Thus the circuit output voltage as seen at terminals 230, 231, with the circuit values given, is indirectly proportional to the signal input voltage.

By way of example, assume a controlling pulse of a magnitude less than the breakdown voltage of the Zener diode is applied to the pulse terminals 221, 222. If the signal input voltage is at say 0.5 volt, the current in the emitter circuit is equal to this voltage divided by the value of the resistance 206 or approximately .07 milliampere. The collector current flow is approximately equal to that within the emitter circuit, and it is seen therefore that a voltage drop of .07×7000 or approximately 0.5 volt occurs across the load resistance 228. The voltage appearing at the output terminals 230, 231 is then equal to the algebraic sum of the potential of the battery 224 and this voltage drop, or 20 minus 0.5, yielding an output voltage of 19.5 volts. On the other hand, if the signal input voltage were at its maximum value of 6 volts, the current in the circuit of the emitter 216 would be equal to 6/7000 or approximately .86 milliampere. Assuming again substantially identical current flow in the circuit of the collector 218 the voltage drop across the load resistor 228 would be approximately six volts. The switch output voltage appearing at the output terminals 230, 231 would then be 20 minus 6, or 14 volts.

FIGURE 4 is a chart showing the relation between signal input voltage and switch output voltage for the transistor switch circuit of FIGURE 3 with the circuit values given. It is seen that for a signal input range of 6 volts we have obtained a substantially identical range of voltage. It is noted that the voltage output is inversely proportional to the voltage input, that is, the switch produces a phase reversal of 180 degrees.

The switch circuits of both FIGURES 1 and 3 may be used to sample data in a number of channels. The number of switches required is equal to the number of channels to be sampled and where more than one switch of the types described is used, they are connected in parallel, joining all collector electrodes at point X of the drawings to share a common load resistance, collector battery and circuit output terminals. The switching action may be accomplished by application of the controlling pulses to the switches in a predetermined sequence. In order to stabilize the operating characteristics of the transistors, negative feed-back techniques, well-known in the art, may be employed from the collector circuit to the emitter circuit. Although n-p-n type junction transistors have been shown, p-n-p junction transistors may be used providing proper voltage polarities are observed. Point contact transistors may also be employed if proper stabilization techniques, well known in the art, are employed as well as observation of proper voltage polarities and magnitudes. The theory of operation of common base, common emitter and other transistor configurations is more fully described in "Transistor Electronics," Lo et al., Prentice-Hall Inc., 1955 edition.

What has been described is a new and novel electronic switching means for use in sampled data systems which is light in weight, small in size, has nominal power consumption requirements, a long life, and no moving parts. A particular advantage of such a device is its capability of switching small signal voltages.

It is to be understood that the configurations of the invention together with the typical circuit values herewith shown and described are given by way of example only and that various changes in the circuit values and arrangement of the components may be resorted to without departing from the spirit of the invention and the scope of the sub-joined claims.

I claim:

1. A switch comprising: an electron flow control device having input, output, and control electrodes; means for impressing an input signal voltage between an input electrode and ground; means for deriving a signal from an output electrode when said electron flow control device is conductive which is representative of the input signal voltage in amplitude and wave shape, a semi-conductor device connected to a control electrode, which conducts current in the reverse direction at a constant voltage larger in amplitude than the maximum input signal voltage; and means for impressing a pulse on said controlling electrode which is larger in amplitude than the reverse conducting constant voltage of said semi-conductor device, whereby said electron flow control device is made conductive.

2. A switch comprising: a transistor having input, output, and control electrodes; means for coupling an input signal voltage to an input electrode; means for coupling a signal from an output electrode which is representative of the input signal voltage in amplitude and wave shape when said transistor is conductive; a Zener diode having a breakdown voltage larger than the maximum amplitude of the input signal voltage connected in a reverse-current direction to a control electrode; and means for impressing a pulse on said control electrode which is larger in amplitude than the breakdown voltage of the Zener diode, whereby said transistor is made conductive.

3. A switch comprising: first and second signal input terminals, the second of which is at ground potential; a transistor having a base electrode, a collector electrode, and an emitter electrode; a first resistance connecting said first input terminal and said emitter electrode; first and second terminals for receiving controlling pulses, the second of which is at ground potential; a second resistance connecting said first pulse terminal to said base electrode; a voltage reference diode having two electrodes arranged in the reverse current direction, one electrode connecting to said base electrode and another electrode connecting to ground; first and second output terminals, the first of which connects to said collector electrode; and the second of which is at ground potential; means for biasing said collector electrode; and a third resistance connecting said biasing means to said collector electrode.

4. A switch comprising: a transistor having emitter, base and collector electrodes; an input resistance connected to said emitter electrode; a semi-conductor diode arranged in the reverse current direction connected between said base electrode and ground; a voltage dropping resistance connected to said base electrode; a load resistance connected to said collector electrode; means for impressing an input signal voltage between said input resistance and ground; means connected to said load resistance for biasing said collector electrode; pulse means for making said transistor conductive arranged between said voltage dropping resistance and ground; and means for deriving an output signal voltage from said collector electrode which is representative of the input signal voltage.

5. A switch as defined in claim 4 wherein said transistor is a junction type transistor.

6. A switch as defined in claim 4 wherein said transistor is a n-p-n juntion transistor.

7. A switch as defined in claim 4 wherein said transistor is a p-n-p junction transistor.

8. A switch comprising: a transistor having a base electrode, a collector electrode, and an emitter electrode; first and second circuit input terminals, the first of which is connected to said base electrode and the second of which connects to ground; a first resistance connecting said emitter electrode to ground; a voltage reference diode arranged in the reverse-current direction connected between said emitter electrode and ground; first and second controlling pulse input terminals, the second of which is at ground potential; a second resistance; a conventional diode; said second resistance and said conventional diode connected in series between said emitter electrode and said first pulse input terminal; first and second output terminals, the first of which connects to said collector electrode and the second of which is at ground potential; means for biasing said collector electrode; and a third resistance connecting said biasing means to said collector electrode.

9. A switch comprising: a transistor having emitter, base, and collector electrodes; means for impressing an input signal voltage between said base electrode and ground; a load resistance connected to said collector electrode; means connected to said load resistance for biasing said collector electrode; means for deriving an output signal voltage from said collector electrode when the transistor is conductive which is inversely proportional to the input signal voltage; a voltage dropping resistance connecting said emitter electrode and ground; a semi-conductor diode arranged in the reverse current direction connected between said emitter electrode and ground; a unilateral current conducting device; a series resistor joining said current conducting device and said emitter electrode; and pulse means for making said transistor conductive arranged between said current conducting device and ground.

10. A switch as defined in claim 9 wherein said transistor is a junction type transistor.

11. A switch as defined in claim 9 wherein said transistor is a n-p-n junction transistor.

12. A switch as defined in claim 9 wherein said transistor is a p-n-p junction transistor.

13. An electronic gate switch for sampling signals in N channels comprising: N electron flow control devices each having input, output, and control electrodes; N input circuits, each comprising a resistance and an input electrode; N control circuits comprising another resistance and a control electrode; an output circuit comprising N output electrodes connected together in parallel and a single output resistance; means for applying N control pulses of constant amplitude to said control electrodes in a predetermined sequence; means for applying N varying signal voltages each having a maximum amplitude less than that of its corresponding control pulse to N input circuits; and means for deriving a voltage from said output circuit which is representative of the N signal voltages applied to N input circuits as sampled in said predetermined sequential order.

References Cited in the file of this patent

UNITED STATES PATENTS

| | | |
|---|---|---|
| 2,676,271 | Baldwin | Apr. 20, 1954 |
| 2,831,128 | Sumner | Apr. 15, 1958 |
| 2,854,590 | Wolfe | Sept. 30, 1958 |
| 2,861,237 | Zelina | Nov. 18, 1958 |
| 2,862,113 | Kabell | Nov. 25, 1958 |
| 2,885,572 | Felker | May 5, 1959 |